United States Patent [19]

Morine et al.

[11] 4,043,294
[45] Aug. 23, 1977

[54] CAKE ICING APPARATUS

[75] Inventors: Richard L. Morine; James J. Hokes, both of Euclid, Ohio

[73] Assignee: Fedco Inc., Mentor, Ohio

[21] Appl. No.: 654,871

[22] Filed: Feb. 3, 1976

[51] Int. Cl.² ............................................. B05C 5/02
[52] U.S. Cl. .......................................... 118/9; 118/25
[58] Field of Search ..................... 118/409, 24, 25, 9, 118/4

[56] References Cited

U.S. PATENT DOCUMENTS

| | | | |
|---|---|---|---|
| 2,481,242 | 9/1949 | Reget | 118/24 |
| 2,553,191 | 5/1951 | Hettinger | 118/24 X |
| 3,276,397 | 10/1966 | Poppe et al. | 118/24 X |

*Primary Examiner*—John P. McIntosh

*Attorney, Agent, or Firm*—Daniel G. Blackhurst

[57] ABSTRACT

The specification and drawings disclose an apparatus for applying icing to the vertical sides of a cylindrical cake. The disclosed apparatus comprises a vertically-extending nozzle having a narrow vertical outlet slot adapted to be opened and closed by an oscillated valve member. The outlet slot is closely spaced from a horizontal turntable driven at a selectively variable speed and adapted to rotate a cylindrical cake about its axis. Icing is supplied to the nozzle by a positive displacement pump. Control means are provided for simultaneously starting the pump and opening the valve member. The control means include an adjustable timer so that the time period of icing dispensing can be closely controlled.

7 Claims, 9 Drawing Figures

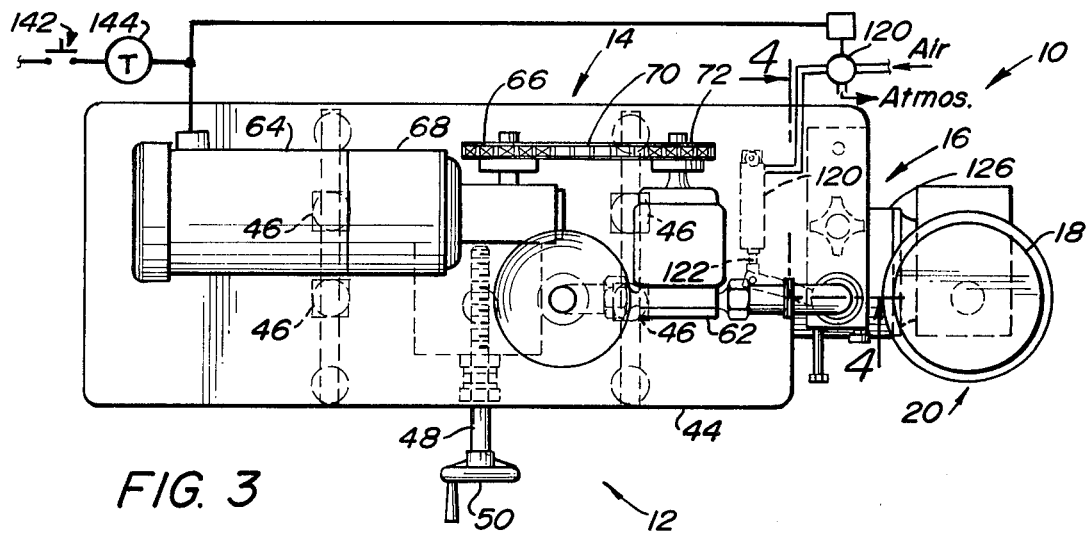
FIG. 3
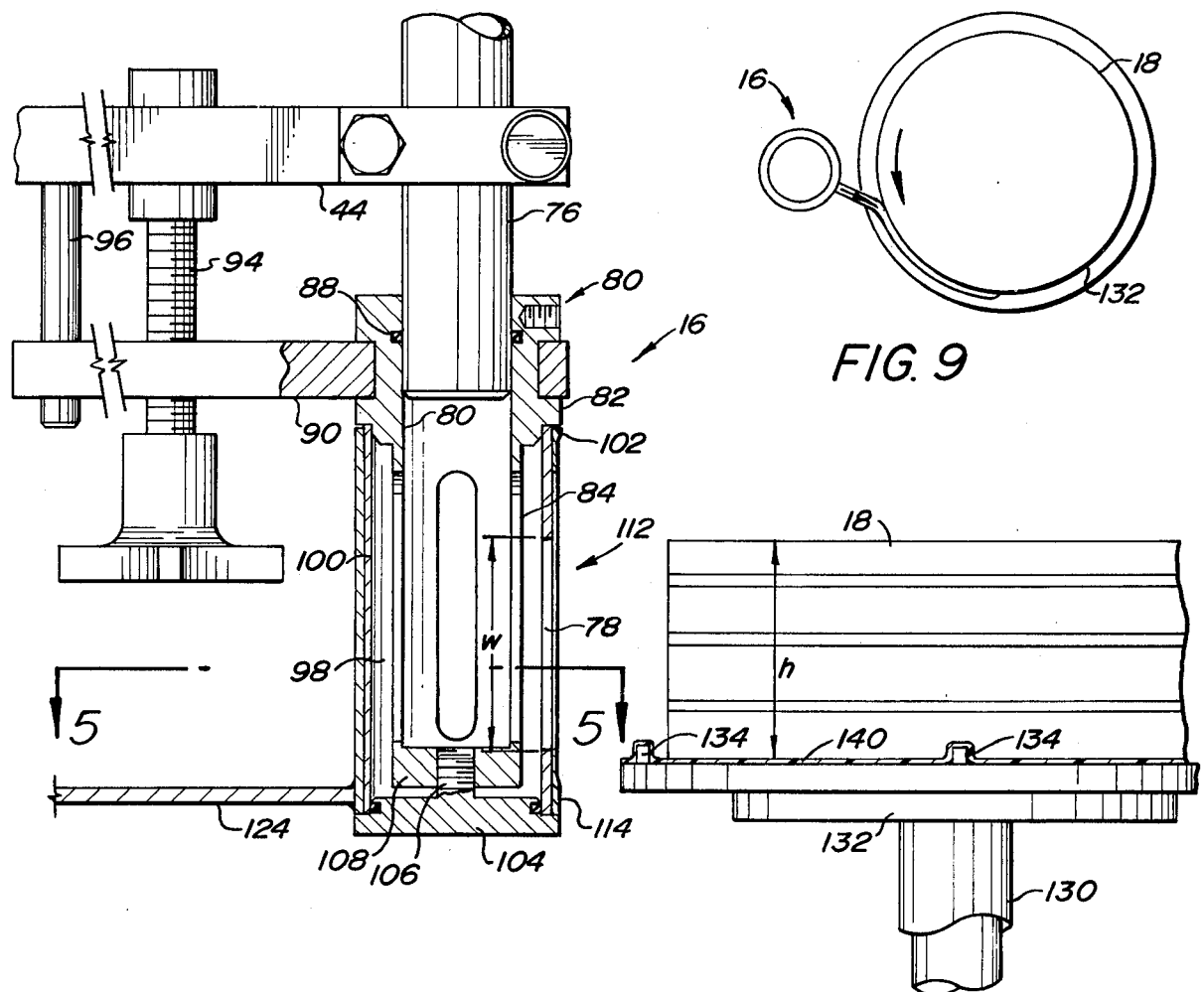
FIG. 4
FIG. 9

CAKE ICING APPARATUS

BACKGROUND OF THE INVENTION

The subject invention is directed toward the art of depositing or dispensing apparatus and, more particularly, to an apparatus for applying frosting or icing to the sides of cylindrical cakes.

Automation of cake production has become a matter of substantial interest in recent years. Suitable machines and devices are avliable for automatically performing most of the steps required in the production of cakes. For example, apparatus for filling pans, transferring through ovens, depanning, layering, and stacking have been developed which function satisfactorily. The major problem in achieving substantially full automation has been the inability to design an apparatus which will satisfactorily apply the icing or frosting. This problem has been particularly acute with respect to the vertical sides of cylindrical layer cakes and the like.

The typical prior approach to the solution of this problem has been to attempt to use blades or spatula-like members mechanically driven to duplicate the manual motions used in applying icing. These attempts have been uniformly unsuccessful for different reasons.

It has also been proposed to apply the icing through an air spraying operation. This has proven to be unsatisfactory because of the difficulty of controlling the spray. Additionally, the appearance of the finished cake has generally been unappealing. Moreover, the properties of the icing have often been distrubed by the aeration and "working" which result from spraying (e.g., the shortening sometimes separated from the sugar).

BRIEF DESCRIPTION OF THE INVENTION

The present invention overcomes the above-discussed problems and provides an apparatus which can apply icing to the sides of a cylindrical cake extremely rapidly and uniformly. For example, the apparatus can ice the sides of an 8-inch diameter layer cake in one second or less. The resulting coating is uniform and attractive. Moreover, the properties of the icing are not affected.

In general, according to one aspect of the invention, the apparatus includes first rotatable support means for supporting a cylindrical cake horizontally with its central axis extending vertically. Power means, preferably variable speed, is connected to the rotatable support means for rotating it at a predetermined speed. Positioned closely adjacent the rotatable support means is at least one icing discharge nozzle means having a narrow outlet opening means of substantial vertical extent. The opening means is located so as to be closely adjacent the side of a cylindrical cake positioned on the rotatable support means. Power-operated valve means are provided for controlling the discharge through the opening means. Icing is supplied to the nozzle means by a power-driven, positive displacement pump connected with the nozzle means through a conduit. Additionally, control means are provided for causing the valve means to be opened and the pump to be energized substantially simultaneously for selectively variable time periods.

Preferably, both the pump and the valve means are controlled by an adjustable timer which allows the total cycle time of icing discharge to be preselected. By controlling the time period of icing discharge, it is possible to cause a ribbon of icing to be deposited around the side of cake with one revolution of the rotatable support means.

The outlet means can be a single vertically-extending slot or a series of short slots of openings. By varying the width of the opening means the thickness of the icing ribbon can be varied. Also, some thickness variation can be achieved by controlling the speed of the pump; however, it is preferable that the pump operate at as low a discharge pressure as possible so that the physical properties of the icing are not affected by the dispensing operation.

According to another aspect of the invention, the cake to be iced is mounted on a cake disc or circle. The cake disc and the rotatable support means have vertically separable, interengagable portions to produce positive rotation of the disc and cake while simultaneously maintaining them centered on the support means.

OBJECTS OF THE INVENTION

Accordingly, a primary object of the invention is the provision of a cake-icing apparatus which can automatically ice the vertical sides of a cylindrical cake without affecting the properties of the icing.

A further object is the provision of an apparatus of the type described which is capable of high-speed operation and which can apply icing in different patterns.

Another object is the provision of an icing apparatus that can be adjusted to vary the thickness of icing applied to the cake.

A still further object is the provision of an apparatus of the type described which is simple to operate and readily adapted for use in automated cake lines.

BRIEF DESCRIPTION OF THE DRAWINGS

The above and other objects and advantages will become apparent from the following description when read in conjunction with the accompanying drawings wherein:

FIG. 3 is a plan view of the dispensing apparatus (the view is taken on line 3—3 of FIG. 1);

FIG. 4 is an enlarged cross-sectional view of the nozzle assembly (the view is taken on line 4—4 of FIG. 3);

FIG. 9 is an enlarged plan view showing the manner in which the nozzle is related to the cake.

DETAILED DESCRIPTION OF THE PREFERRED EMBODIMENT

Figure 1:
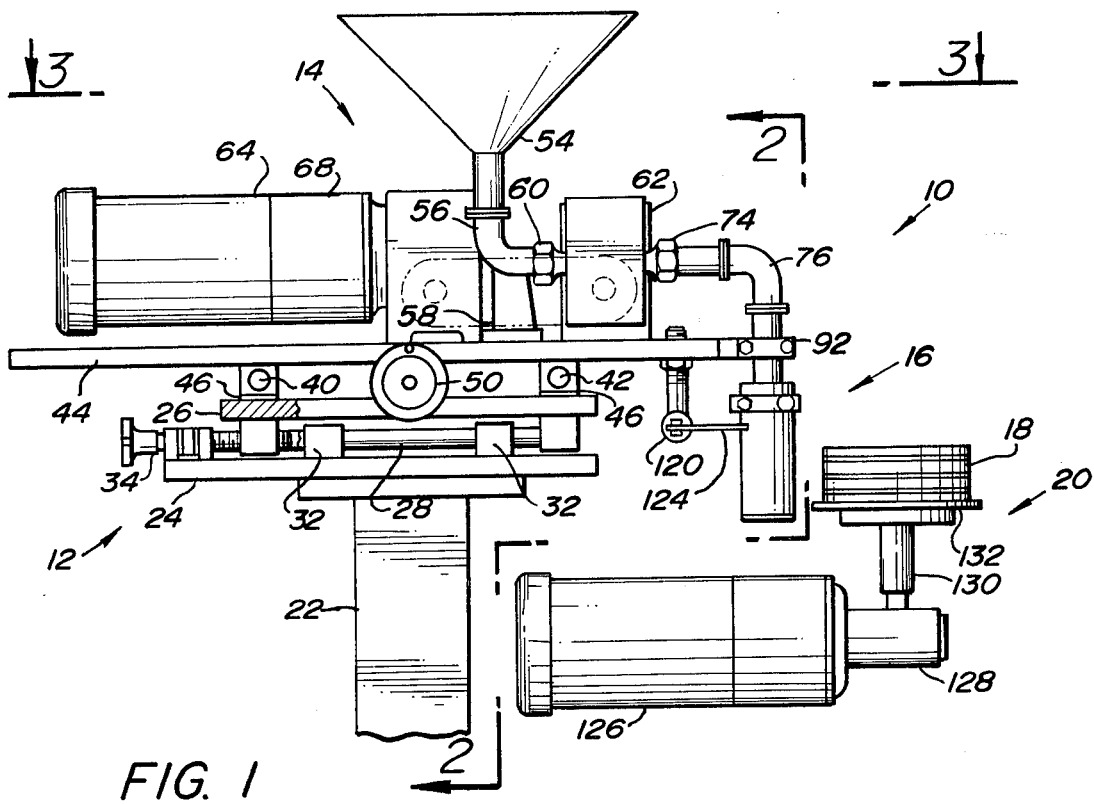
FIG. 1 is a side elevational view of an apparatus embodying the invention.
Figure 2:
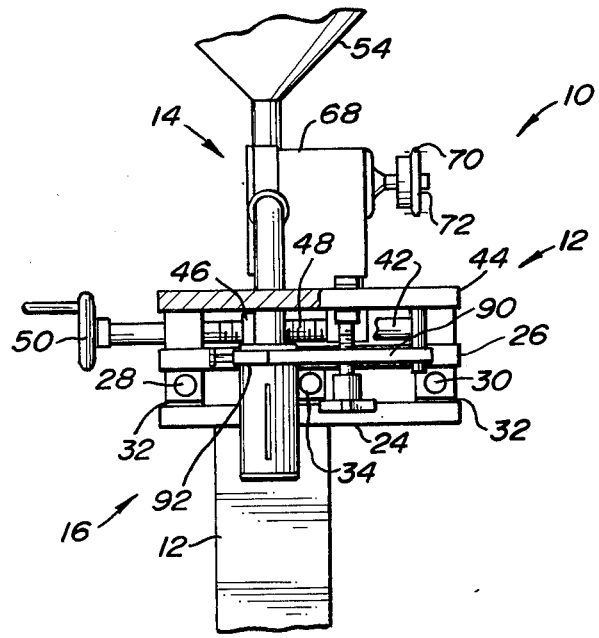
FIG. 2 is an end view of the apparatus of FIG. 1 (the view is taken on line 2—2 of FIG. 1)
Figure 5:
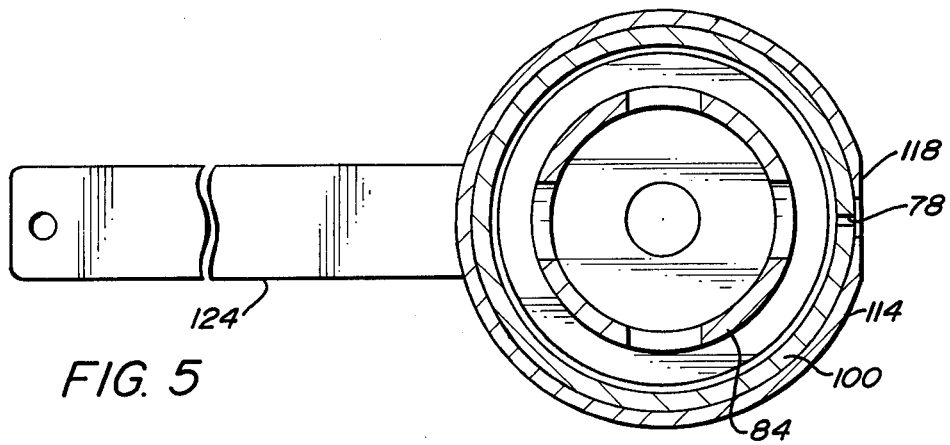
FIG. 5 is a cross-sectional view taken on line 5—5 of FIG. 4.
Figure 6:
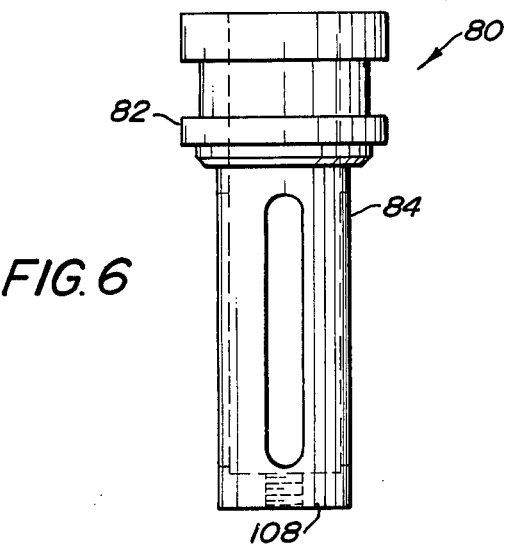
FIGS. 6, 7 and 8 are side views of component parts of the nozzle assembly.

Referring more particularly to the drawings wherein the showings are for the purpose of illustrating a preferred embodiment of the invention only, and not for the purpose of limiting same, FIGS. 1-3 show the overall arrangement of the icing apparatus 10. Broadly, the apparatus includes an adjustable support base assembly 12 which carries the icing supply and pump assembly 14. A discharge nozzle assembly 16 is carried at the right-hand end of support base assembly 14 (as viewed in FIG. 1). Nozzle assembly 16 is arranged to direct a thin ribbon of icing toward the vertical sides of a cake 18 mounted on a cake-rotating assembly 20.

ADJUSTABLE SUPPORT BASE ASSEMBLY 12

The apparatus 10 is constructed to provide precisely adjustable horizontal positioning of the nozzle assembly 16 by the provision of the adjustable support base assembly 12. Base assembly 12 includes a main support post or pedestal 22 which has a horizontal support plate 24 connected thereto. A plate 26 is carried from plate 24 for adjustable movement horizontally to the left or right as viewed in FIG. 1. For this purpose, a pair or slide rods 28 and 30 are mounted on the underside of plate 26. Suitable bearing blocks 32 are affixed to the top of plate 24 and slidably receive rods 28 and 30. Adjustable movement of plate 26 is accomplished through a manual adjusting screw 34 carried at the end of plate 24 and having its threaded end portion 36 received in a drive nut 38 carried on the undersurface of plate 26. Consequently, selective rotation of screw 34 can produce precise locating of plate 26 to the left or right as viewed in FIG. 1.

Adjusting movement in the horizontal plane at right angles to the movement of plate 26 is provided by a second set of slide rods 40 and 42 which are connected to the underside of main base plate 44. Rods 40, 42 are slidably received in bearing blocks 46 extending upwardly from plate 26. Selective movement of the main plate 44 is provided by screw rod 48 and handwheel 50. As shown, screw rod 48 is rotatably mounted on plate 26 and has its threaded end engaged with a drive nut 52 connected to the underside of plate 44.

As can be appreciated, by adjustment of drive screws 34, 48, the location of main base plate 44 and the equipment carried thereby can be precisely located in the horizontal plane. This permits exact positioning of the nozzle assembly 16 relative to the cake 18.

ICING SUPPLY AND PUMP ASSEMBLY 14

The icing supply and pump assembly could take many specific forms; however, in the preferred embodiment it comprises a generally conically-shaped icing supply hopper 54 formed from stainless steel or other suitable material. The lower or outlet end of hopper 54 is releasably connected to and supported by a discharge elbow 56 having a base 58 attached to plate 44. The outlet of elbow 56 is directly connected to the inlet 60 of a variable-speed, positive displacement pump 62. Pump 62 could be of many types but is preferably a conventional gear pump.

The drive means for the pump 62 is arranged to drive the pump at selectively variable speeds so that the quantity of icing discharged by the pump per time period can be closely controlled. Additionally, the drive means is preferably capable of starting and stopping the pump very rapidly so that icing discharge can be quickly started and teminated. Many types of power and drive means capable of performing these functions are known, but in the subject embodiment they are shown as including a variable-speed electric motor 64 which drives a sprocket 66 through a conventional, electrically-actuable clutch and brake unit 68. The output sprocket 66 of unit 68 is connected through a roller chain 70 with the input drive sprocket 72 of pump 62 (see FIG. 3).

As can be appreciated, with motor 64 continuously operating, actuation of clutch and brake unit 40 can produce nearly instantaneous starting and stopping of pump 62. This permits precise control of the icing dispensing operation without subjecting the icing to excessive working or high pressures. This aspect of the invention will subsequently become apparent.

DISCHARGE NOZZLE ASSEMBLY 16

The icing discharged from outlet 74 of pump 62 is conducted through a pipe or tube 76 to a discharge nozzle assembly 16. Although the more specific features of the nozzle assembly 16 are important to somewhat limited aspects of the invention, for the present it is sufficient to note that it includes a relatively narrow, vertically-elongated outlet discharge slot means 78. As will subsequently be explained, outlet slot means 78 can comprise a single elongated slot as shown, or a series of closely-spaced slots or small openings, circular or otherwise. In any event, the outlet slot means should be such that the icing exits or is impelled from the nozzle means in a comparatively thin, ribbon-like discharge having a width $w$ in the vertical direction substantially equal to the height $h$ of the cake (see FIG. 4). As shown in FIGS. 4 and 9, the discharge outlet slots means is directed generally toward the cake so that the side of the cake is coated with icing.

The spacing between the outlet slot means and the cake can vary but is preferably comparatively narrow. That is, there should be very little drop of the discharged icing stream. Additionally, the nozzle should be positioned such that the discharge stream has a major component of motion generally in the direction of cake rotation as shown in FIG. 9.

By varying various operational parameters, it is possible to produce a variety of textures and/or thicknesses of icing. For example, with the outlet means directed to cause the icing stream to impinge the cake somewhat tangentially, the icing is applied smoothly assuming that the surface speed of rotation of the cake and the velocity of the stream are nearly equal. By changing the angle of discharge, speed of cake rotation, volume or velocity of icing discharge and the like, it is possible to produce different icing patterns between smooth and heavily rippled. This illustrates the importance of being able to precisely adjust the position of the nozzle.

Even greater variations in icing application can be achieved by changing the configuration of the discharge slot means. For example, by using a series of short, vertical slots or circular openings, the icing can be applied in smooth or rippled ribbons which touch, overlap or are spaced. similarly, the thickness of the icing application can be varied by changing the width of the outlet slot means.

As previously mentioned, the discharge nozzle assembly 16 can have a variety of specific constructions. However, the construction of the subject embodiment offers distinct advantages which will become apparent. As best shown in FIGS. 4–8, the preferred construction comprises a main nozzle body member 80 having an upper collar portion 82 and a lower outlet sleeve portion 84. The axial opening 86 of member 80 is sized to be slidably receivable on the lower end of conduit 76. A suitable 0-ring 88 is provided to assure a fluid seal while permitting free vertical sliding movement of member 80.

Member 80 is adjustably supported from the end of support plate 44 by a bracket plate 90. An end cap 92 on plate 90 releasably secures member 80 thereto (see FIGS. 2 and 3). Plate 90 is mounted for vertical adjustment by an adjusting screw 94 threadedly received in plate 90 and rotatably carried from plate 44. A guide pin 96 extends down from plate 44 through an opening in plate 90. By adjusting screw 94, the vertical position of outlet slot 78 can be shifted to assure precise alignment with the side of a cake 18.

The sleeve portion 84 of member 80 is provided with a plurality of vertical outlet slots which allow icing to discharge into the annular space 98 between the sleeve portion 84 and a nozzle tube 100. Nozzle tube 100 is shown in detail in FIG. 8. Tube 100 is closely received on shoulder 102 of member 80. It is clamped in position by an end cap 104 having a threaded stud 106 which extends into the end 108 of sleeve portion 84 of member 80. An O-ring 110 is carried in end cap 104 to seal the lower end of tube 100.

By loosening end cap 104, the position of tube 100 can be varied to shift the outlet direction of slot means 78. Additionally, if desired, different tubes 100 can be installed to provide different outlet configurations. Alternatively, tube 100 can have a plurality of outlet slot means formed therein for selective indexing into discharge position.

As mentioned earlier, the icing supply pump 62 is started and stopped to control the flow of icing through slot means 78. An additional and more precise control of icing flow is assured by a nozzle valve means 112. Valve means 112 comprises a rotatable valve sleeve 114 (FIG. 7) carried about the outer surface of tube 100. The length of valve sleeve 114 is slightly less than the length of tube 100. Consequently, while sleeve 114 is held in position by end cap 104, it can freely rotate relative to tube 100.

Figure 7:
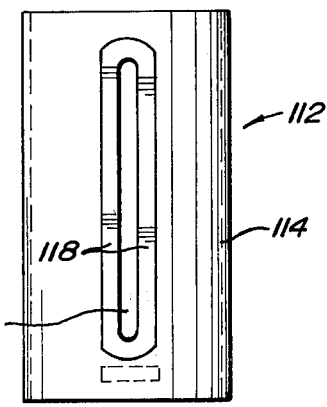
Figure 8:
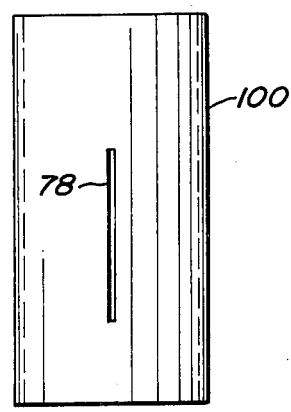

As shown in FIGS. 7 and 4, valve sleeve 114 includes a vertical valve slot 116 having a length and width slightly greater than the corresponding dimensions of outlet slot means 78. Preferably, the sides of valve slot 116 are beveled as shown at 118 in FIGS. 5 and 7. Thus, when slot 116 is rotated past slot means 78, a sharp cut-off of icing is assured.

Operation of the valve sleeve 114 is accomplished by an air cylinder 120 mounted under plate 44 (see FIGS. 1 and 2). The piston rod 122 of cylinder 120 is pinned to an actuating arm 124 extending outwardly from valve sleeve 114. Accordingly, by controlling the supply of air to cylinder 120, the valve sleeve 114 is shifted to open and close the outlet slot means 78.

CAKE ROTATING ASSEMBLY 20

Use of described apparatus to achieve uniform application of icing to a cake 18 depends upon closely-controlled rotational speed of the cake. For this purpose, the cake-rotating assembly includes a variable-speed electric motor 126 and a right-angle output drive unit 128. The output shaft 130 of unit 128 carries a turntable 132 sized for the particular cakes to be iced by the apparatus.

Although not absolutely necessary to the operation of the apparatus, it is preferable to provide a positive centering and drive connection between the turntable and the cake. Many different types could be provided. According to the subject embodiment, the turntable 132 carries upwardlyextending pins or the like 134 which are received in aperatures or recesses 136 formed in a cake-supporting disc 140 (see FIG. 4). A cake disc is a plastic or cardboard disc on which each cake is positioned during assembly and packaging. The engagement between pins 134 and the recesses of the cake disc 140 of each cake assures positive centering and rotation

CONTROL SYSTEM

The subject apparatus requires only simple controls of the type shown diagrammatically in FIG. 3. It should be understood that both motors 64 and 126 include conventional-speed controls and on-off power switches not shown. With respect to the clutch-brake unit 68 and the air cylinder 120, the operation of these components must preferably by controlled to operate simultaneously and for a precise time period depending upon the speed of rotation and diameter of a cake 18. To perform these functions, the system includes a main power switch 142 and an adjustable timer 144. Timer 144 can be adjusted to permit energization of the clutch-brake unit 68 and the air supply valve 146 for a predetermined time so that the pump is driven only while the air cylinder is actuated to have the valve sleeve 114 in the open position.

Because of the simultaneous energization of the pump 62 and air valve 120, discharge and cut-off of icing is closely controlled without subjecting the icing to excessive working or high pressures. Additionally, the timer permits icing discharge to be closely controlled relative to cake rotation so that icing application is precise with little or no overlap.

The subject invention has been described in great detail sufficient to enable one of ordinary skill in the art to make and use the same. Obviously, modifications and alterations of the preferred embodiment will occur to others upon a reading and understanding of the specification and it is our intention to include all such modifications insofar as they come within the scope of the appended claims.

Having thus described our invention, we claim:

1. Apparatus for applying icing to the sides of cylindrical cakes comprising:
   a. a rotatable support means for supporting a cylindrical cake in a generally horizontal position with the axis of the cake extending vertically;
   b. power means for selectively rotating said support means to cause a cake positioned thereon to be rotated about said axis;
   c. icing discharge nozzle means positioned closely adjacent said support means by means which permit selective adjustment of said nozzle means relative to said support means and including a closed chamber having a vertically-elongated discharge slot means and valve means operable to open and close said slot means;
   d. a source of icing;
   e. variable-speed, positive displacement pump means connected between said source of icing and said chamber for supplying icing to said chamber under a comparatively-lower pressure; and,
   f. control means including a timer for energizing said pump means and opening said valve means for a period of time substantially equal to one revolution of said support means and thereafter substantially simultaneously stopping said pump means closing said valve means.

2. The apparatus as defined in claim 1 including means for selectively varying the speed of said power means to vary the speed of rotation of said support means.

3. The apparatus as defined in claim 1 wherein said chamber is defined by an elongated cylinder and said valve means includes a valve element arcuately movable about the outer surface of said cylinder.

4. The apparatus as defined in claim 1 wherein said chamber means includes a movable member which defines said slot means, said movable member being mounted for adjustment for varying the dimensions of said slot means.

5. The apparatus as defined in claim 1 wherein said timer is selectively variable.

6. The apparatus as defined in claim 1 wherein said nozzle means includes a sleeve member mounted for arcuate adjustment so that the direction of icing discharge can be varied.

7. The apparatus as defined in claim 1 wherein said rotatable support means includes means for drivingly engaging a cake disc.

* * * * *